United States Patent [19]
Capgras

[11] 3,736,001
[45] May 29, 1973

[54] AUTOMOBILE SUSPENSION

[76] Inventor: Rene Capgras, 51 rue du Rocher, Paris, France

[22] Filed: Feb. 17, 1971

[21] Appl. No.: 116,196

[30] Foreign Application Priority Data

Feb. 24, 1970  France..............................7006441

[52] U.S. Cl............................280/124 F, 267/64 R
[51] Int. Cl...............................................B60g 11/26
[58] Field of Search................280/124 F; 267/64 R, 267/65 R

[56] References Cited

UNITED STATES PATENTS

| | | | |
|---|---|---|---|
| 3,328,019 | 6/1967 | Wilson | 267/64 R |
| 3,348,835 | 10/1967 | Casey | 267/65 R |

*Primary Examiner*—Philip Goodman
*Attorney*—Karl F. Ross

[57] ABSTRACT

A hydraulic jack, forming part of a hydropneumatic suspension for an automotive vehicle, comprises a cylinder with two end portions of relatively small inner diameter and an intermediate portion of relatively large inner diameter, the latter being subdivided into two chambers by a closely fitting piston head formed as a transversely shiftable ring on a piston body. The ring is bracketed between two shoulders on the piston body, one of them being formed by a detachable collar, and has annular grooves in its end faces occupied by annular gaskets which contact the confronting faces of the collars to form a fluidtight joint. The extremities of the piston body are in fluidtight contact with the reduced end portions of the cylinder, one of these end portions forming a further fluid chamber; the opposite piston is hollow and accommodates a piston rod universally jointed within the piston body at the level of its shiftable ring.

10 Claims, 3 Drawing Figures

Patented May 29, 1973

INVENTOR:
René CAPGRAS

BY Karl F. Ross

ATTORNEY

Patented May 29, 1973

INVENTOR:
René CAPGRAS

BY Karl F. Ross

ATTORNEY

AUTOMOBILE SUSPENSION

The present invention relates to hydro-pneumatic suspension systems for motor vehicles, and particularly to a suspension system designed to ensure both a level ride and the correct suspension of the vehicle body.

One type of hydro-pneumatic suspension device to which the invention can be applied is described in my copending application Ser. No. 808,399 filed 19 Mar. 1969, now U.S. Pat. No. 3,606,374. As discussed and claimed in that patent, each suspension component comprises a triple-acting differential piston in a cylinder which forms three independent hydraulic-fluid chambers. The manufacture of such a device presents very difficult problems because the cylinder bores and the pressure faces or lands of the differential piston must be machined to extremely close dimensions, to restrict the diametrical play as well as to maintain correct alignment. In conventional practice, this manufacture would be extremely costly and with little guarantee of adequate accuracy.

The present invention has the aim of avoiding these manufacturing problem by providing a particularly simple yet robust construction for a jack in a suspension system of the type described above.

According to this invention, the piston has two coaxial portions in sliding and sealing engagement with the wall of the cylinder, there being a "floating" ring surrounding part of the piston between the two sliding and sealing portions; this ring sealingly engaged the piston and is restrained against axial movement thereon but free to move radially relatively thereto, the exterior of the ring being adapted to provide a sliding seal in part of the bore of the cylinder.

Preferably the piston and cylinder have the construction described in my aforementioned U.S. Pat. No. 3,606,374.

According to a preferred construction, the two cylinder-engaging portions are the extremities of a unitary piston body which is provided with two axially spaced collars bracketing the "floating" ring, with interposition of sealing means between each end face of the ring and the confronting face of the respective collar.

Preferably a thrust rod, connected to the piston by a universal joint, is adapted to transmit motion in both axial directions of the piston movement. The thrust rod may have a ball end held between two part-spherical bearing seats fitted to the piston. Owing to this arrangement, the thrust rod can both pull and push the piston of the suspension jack which in turn can act in one direction or the other on the thrust rod, principally in order to ensure the leveling of the vehicle.

According to a further feature of the invention, the bearing socket of the universal joint is disposed in the central part of the piston, i.e., in the part of the body surrounded by the "floating" ring. This arrangement is advantageous for absorbing transverse forces developed during operation.

As regards the sliding seal through which the body of the piston passes from the outer atmosphere to one of the annular fluid chambers of the jack, any known device may be used such as, for example, a stack of rigid washers and toric gaskets of deformable material.

One construction of a hydro-pneumatic suspension system in accordance with the invention will now be described by way of example with reference to the accompanying drawing in which.

Figure 1:
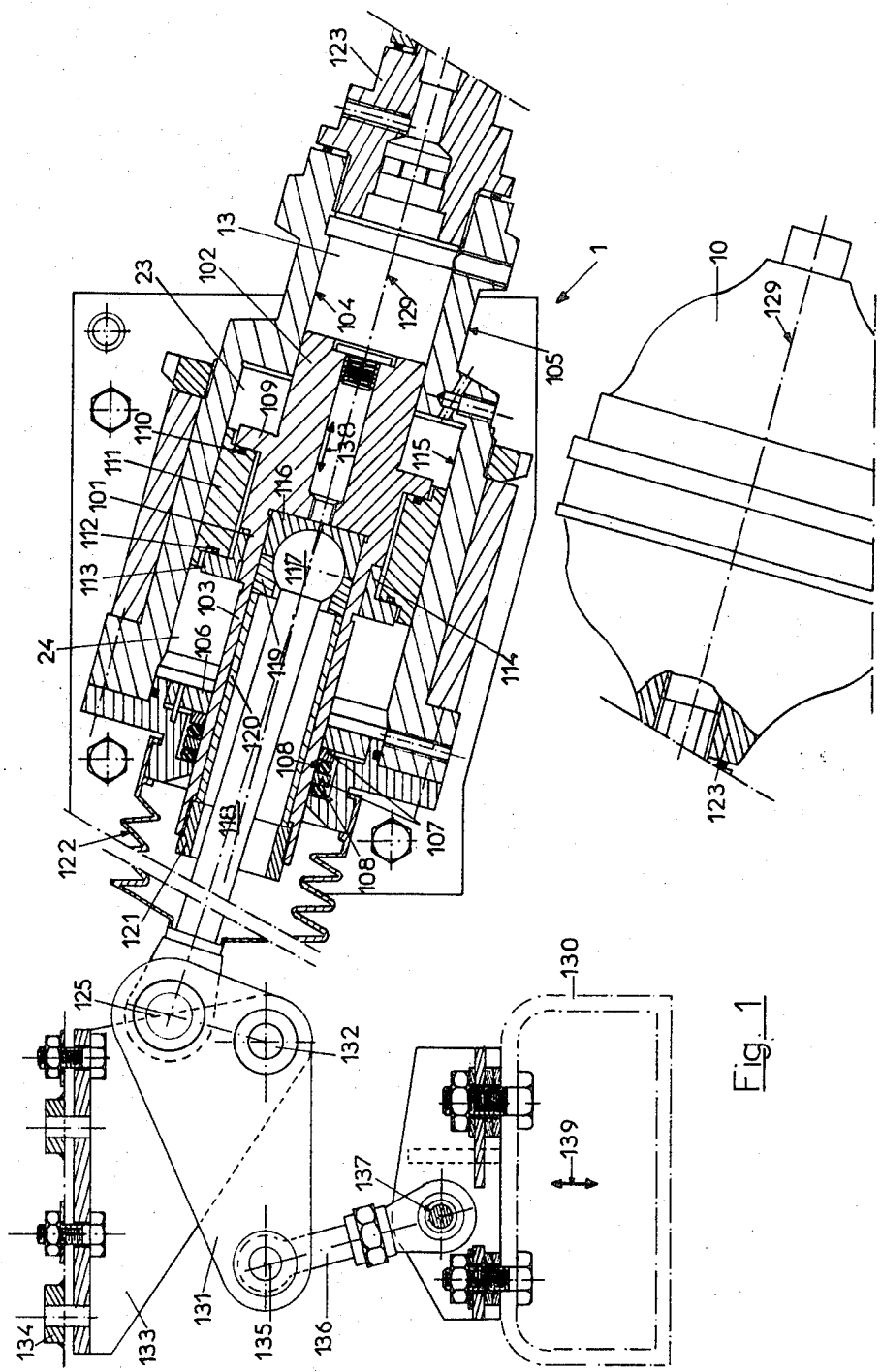
FIG. 1 is an axial cross-section through a suspension element particularly designed for fitting to the rear axle of a vehicle.

The drawing shows various parts of a motor vehicle, e.g., a truck, whose suspension and roll-correction system operate on the principle described in my above-mentioned U.S. Pat. No. 3,606,374. This operating principle need therefore not be described in detail.

It is sufficient to recall that at each end of an axle, carrying two road wheels of the vehicle, there is provided a hydro-pneumatic element or jack 1 in which a triple-acting differential piston slides in a fixed cylinder which forms three independent hydraulic fluid chambers 13, 23 and 24 (see FIG. 1). The principal feature of the present invention concerns the construction of the element 1 as illustrated in FIG. 1. In this construction, the piston has a body 101 provided at its ends with two cylindrical portions 102 and 103 in sliding and sealing engagement with the inner wall surface of a cylinder 105; piston extremity 102 slides in a bore 104 whereas extremity 103 extends outwardly through the opposite end 106 of the cylinder 105. cylinder is ensured by a packing in the form of a stack of rigid annular washers 107 alternating with deformable toric gaskets 108. This seal prevents fluid leakage from the chamber 24 to the surrounding atmosphere through the removable end wall 106 forming the bottom of cylinder 105.

At the central part of the piston, the body 101 thereof is integrally formed with an annular flange or collar 109. Upon the flat lower face of the shoulder formed by the flange 109, which is proximal to chamber 13, bears an annular gasket 110 seated in a groove formed in a confronting flat end face of a "floating" ring 111. This ring, made from metal, has its opposite end face formed with a similar annular groove in which is seated another annular gasket 112. The latter bears on the upper annular face of a flange or collar 113 of a metal ring 114 which is screwed onto the piston body 101.

This arrangement restrains the transversely shiftable solid ring 111 against axial displacement relative to the body 101 by clamping same between the collar 109 and the flange 113 of the ring 114 defining therewith a piston head of variable eccentricity; the ring 111 is free to move transversely (i.e., in a radial direction of the piston). Fluidtight contact between the ring and the piston body is ensured by the seals 110 and 112. Piston head 109 – 113 is subjected to differential fluid pressure from chambers 23 and 24.

The cylindrical outer peripheral surface of the ring 111 forms a sliding seal in a bore 115, machined to the required diameter equaling that of this ring, in the cylinder 105 of the hydraulic jack. The intermediate cylinder portion defined by bore 115 is of substantially larger inner diameter than its end portions 104, 106.

Into the piston body 101, approximately in line with the shiftable ring 111, there is inserted a hemispherical bearing seat 116 forming a socket for a ball 117 at the end of a thrust rod 118 engaging a link 125. After the ball 117 has been fitted into the bearing seat 116, a retaining ring 119 with a part-spherical bearing surface is slipped over the control rod 118 and, in conjunction with the seat 116, imprisons the ball 117 within piston body 101. Thus the rod 118 can swing in relation to the longitudinal piston axis by virtue of this universal joint but is restrained against axial movement relative to the piston body 101 in both directions. In other words, the rod 118 can push or pull the piston body 101 and can transmit hydraulic forces directed in either axial direction.

The fixing of the ring 119 and the seat 116 inside the body 101 is ensured by means of a sleeve 120 which enters a bore in the sliding portion 103 of the piston and engages the ring 119 from below. The sleeve 120 is itself retained by a clamping ring 121 screwed into the end of the part 103. A flexible cover 122 protects the mechanism against the ingress of dirt while leaving the rod 118 free to move.

At the opposite end of the jack 1, the cylinder 105 thereof is fixed to a body 123 of a conventional suspension sphere 10 which contains the gas cushion of a main pressure accumulator. This gas cushion acts directly on the hydraulic fluid in the chamber 13.

Figure 2:
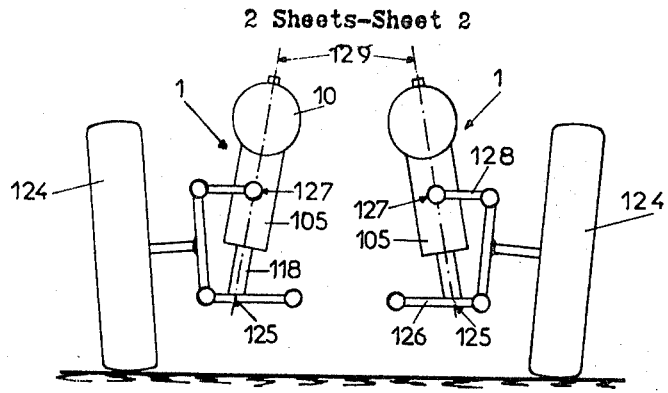
FIG. 2 illustrates diagrammatically the separate mounting of two suspension elements in accordance with the invention on the axles of the front wheels of a vehicle.
Figure 3:
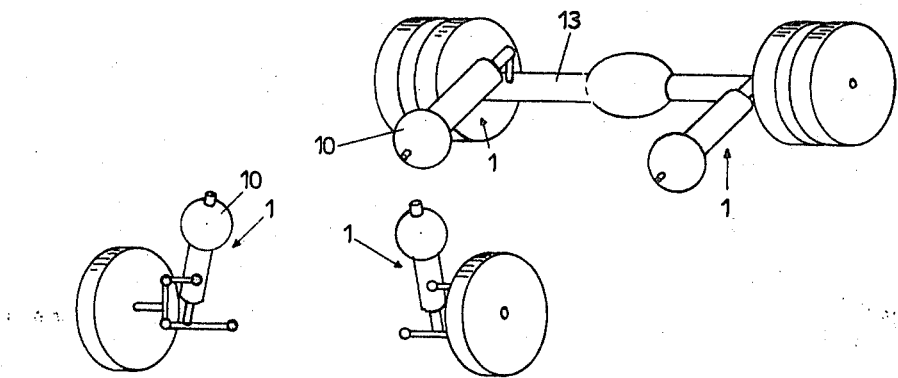
FIG. 3 illustrates diagrammatically the overall arrangement of the vehicular suspension system according to the invention.

In addition, the annular chambers 23 and 24, which ensure the leveling of the vehicle body, are connected by crossed channels (not shown) to the corresponding chambers of an identical jack 1 paired with the first one as shown in FIGS. 2 and 3. The hydraulic system is similar to that which is disclosed in my aforementioned U.S. Pat. No. 3,606,374.

It will be appreciated that the hydraulic jack 1 in accordance with the invention possesses real practical advantages.

First of all, it ensures excellent sealing between the three hydraulic chambers 13, 23 and 24 and the outer atmosphere, without requiring a very accurate machining of any parts of the device to very strict alignment tolerances between the bores 104 and 115 and the bottom opening 106 of the cylinder. Secondly, the position of the ball joint 117 at the level of the ring 111, i.e., near the center of the piston, is conducive to a good absorption of the transverse forces which occur during operation of the device. Finally, it will be observed that the jack 1 may be of compact design facilitating its installation in the vehicle.

Some examples of the use of a hydraulic jack embodying the invention have been shown in FIGS. 2 and 3.

In FIG. 2, there is shown the mounting of the jacks 1 on the dirigible front wheels 124 of a truck. In this arrangement, the link 125 of each rod 118 is carried by the lower arm 126 of an independent suspension for each of the road wheels 124. The cylinder 105 of each jack is fixed to the chassis, as is the pivot 127 of the upper arm 128. The two jacks 1 of the front suspension are placed almost in the same vertical plane, their longitudinal axes 129 converging in the upward direction.

As illustrated in FIG. 3, the jacks 1 associated with the rear-axle suspension 130 are directed toward the front of the vehicle, with a slight inclination to the horizontal. Each of these devices is connected by the link 125 of its control rod 118 to a triangular lever 131 (see FIG. 1) which constitutes a bell crank. This lever carries at its other two corners a pivot 132, linking it with a yoke 133 attached to the chassis 134 of the vehicle, and a pin 135 which by means of a connecting rod 136 of adjustable length is connected to a pivot pin 137 engaging an external load, i.e., the rear axle 130.

It will be seen from FIG. 1 that the described linkage moves the piston body 101 axially (in the direction of the arrow 138) when the axle 130 is displaced vertically (arrow 139) with reference to the chassis 134.

The construction according to the invention not only simplifies the manufacture of a robust and inexpensive suspension element but also enables a considerable reduction in the overall bulk of such element. FIG. 3 shows how the suspension elements 1 may be fitted to the vehicle in a limited space. This is of particular advantage in a heavy-duty vehicle.

What we claim is:

1. A hydraulic jack for a hydropneumatic automotive suspension system, comprising:
   a cylinder with two end portions of relatively small inner diameter and an intermediate portion of relatively large inner diameter, one of said end portions forming a first fluid chamber:
   a piston in said cylinder having a body with extremities received with fluidtight fit in said end portions and further having a head between said extremities dividing said intermediate portion into a second and a third fluid chamber, said head including a pair of axially spaced collars rigid with said body and a solid ring transversely shiftable between said collars but in fluidtight contact therewith, the outer diameter of said ring equaling said relatively large inner diameter, one of said extremities being subjected to fluid pressure in said first chamber, said head subjected to differential fluid pressure in said second and third chambers; and
   link means anchored to the other of said extremities for operatively connecting said piston with an external load.

2. A jack as defined in claim 1 wherein said ring and said collar are provided with pairs of flat end faces confronting each other, one of the end faces of each pair being provided with an annular gasket engaging the other end face.

3. A jack as defined in claim 1 wherein the collar proximal to said one of said extremities is integral with said body, the collar proximal to said other of said extremities being detachably secured to said body.

4. A jack as defined in claim 1 wherein said cylinder has a removable end wall, remote from said first fluid chamber, forming the other of said end portions.

5. A jack as defined in claim 4 further comprising packing means in said removable collar engaging said other of said extremities.

6. A jack as defined in claim 1 wherein part of said body including said other of said extremities is hollow, said link means comprising a rod passing through said hollow extremity.

7. A jack as defined in claim 6 wherein said rod is universally jointed to the piston inside said body.

8. A jack as defined in claim 7 wherein the universal joint between said rod and said piston is located in a region of said body surrounded by said ring.

9. A jack as defined in claim 8 wherein said universal joint comprises a ball rigid with said rod, a socket in said body forming a hemispherical seat for said ball, a retaining member engaging said ball on the side opposite said socket, and clamping means in said hollow extremity holding said retaining member in place.

10. A jack as defined in claim 6 further comprising a flexible cover secured to said cylinder and to a projecting end of said rod.

* * * * *